(No Model.) 2 Sheets—Sheet 2.
H. L. HOWE.
AUTOMATIC CLUTCH OR GOVERNOR.
No. 567,393. Patented Sept. 8, 1896.
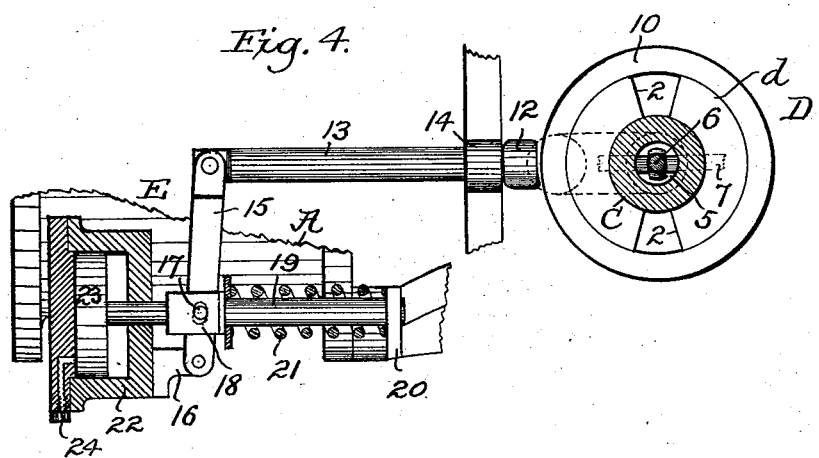
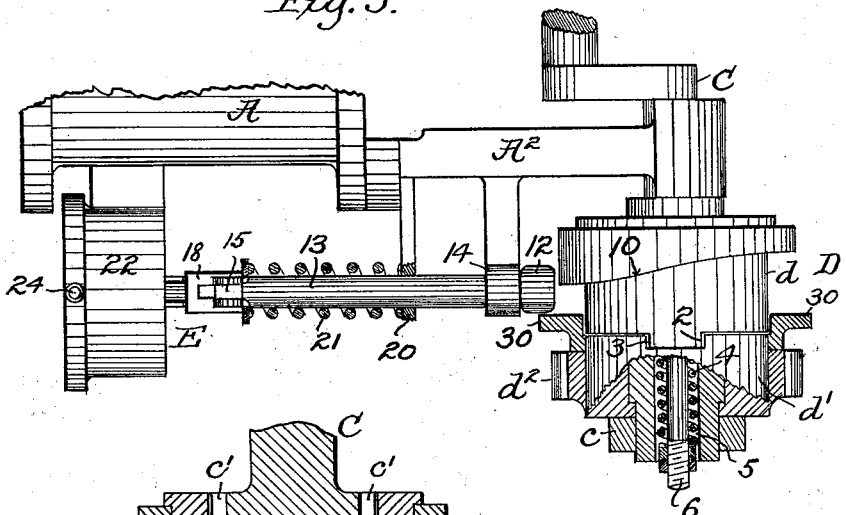
WITNESSES:
W. H. Graham
E. L. Todd
INVENTOR
Henry L. Howe
BY
Geo. H. Graham
ATTORNEY
THE NORRIS PETERS CO., PHOTO-LITHO., WASHINGTON, D. C.

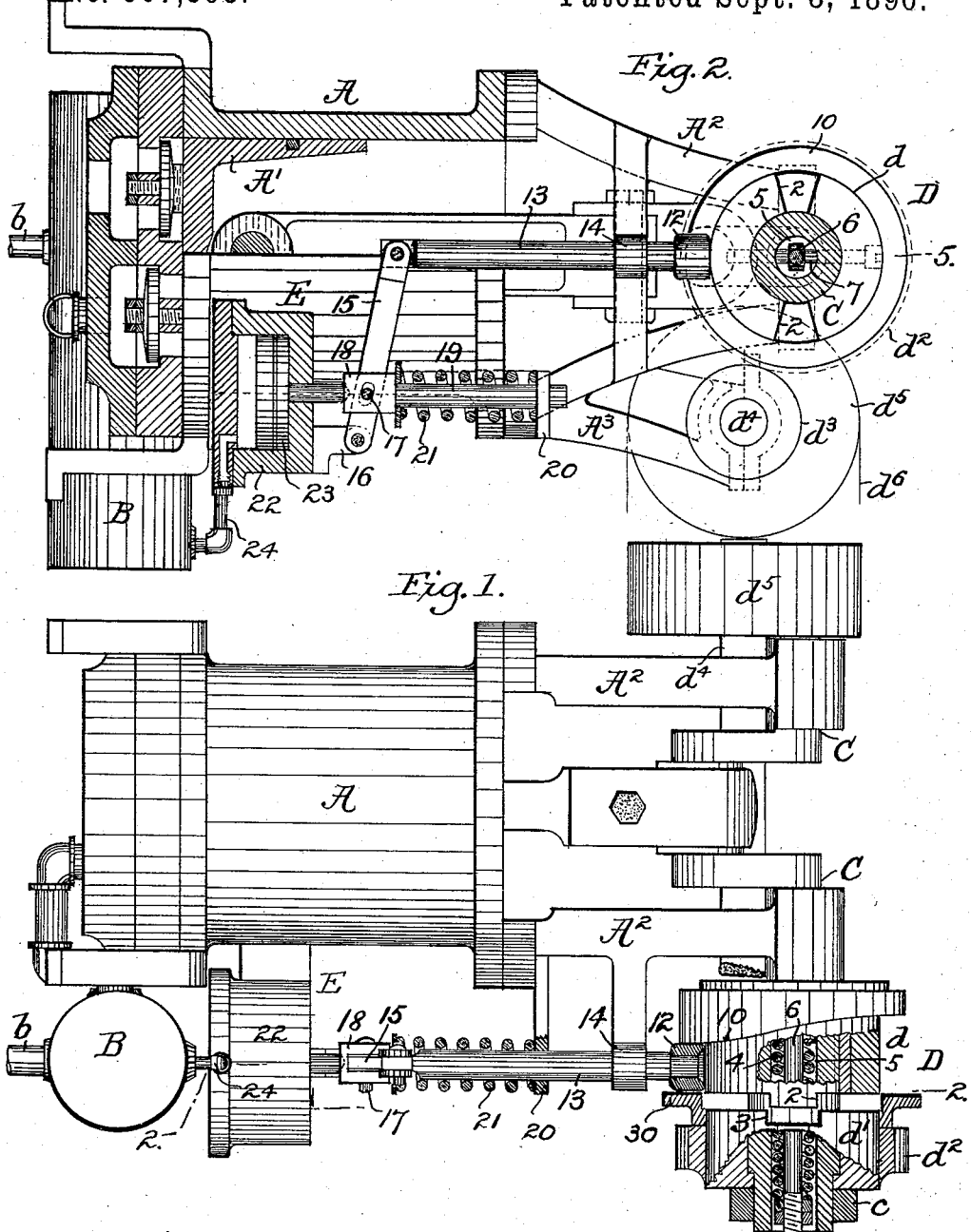

UNITED STATES PATENT OFFICE.

HENRY L. HOWE, OF CANANDAIGUA, NEW YORK.

AUTOMATIC CLUTCH OR GOVERNOR.

SPECIFICATION forming part of Letters Patent No. 567,393, dated September 8, 1896.

Application filed February 1, 1896. Serial No. 577,758. (No model.)

*To all whom it may concern:*

Be it known that I, HENRY L. HOWE, a citizen of the United States of America, residing at Canandaigua, county of Ontario and State of New York, have invented certain new and useful Improvements in Automatic Clutches or Governors, of which the following is a specification.

This invention relates generally to fluid-pressure brakes adapted, say, for use on street-cars or other vehicles, and more particularly to an automatically-operative clutch or governor for controlling the operation of the air pump or compressor by the variation of pressure supplied thereby for applying the brakes.

More broadly considered, the invention relates to means for controlling the connection and disconnection of a driver with a part to be driven, such as the air-pump referred to.

The object of the improvements, among other things, is to provide means for controlling the action, say, of an air-pump, which shall be certain and accurate in operation, simple in construction, and in which the minimum of wear is effected.

To these ends they consist generally in a clutch, one member of which constitutes the driver and the other the driven member, with a pressure or otherwise automatically-controlled abutment or with means for controlling an abutment adapted when the desired pressure has been reached to engage one or the other of the clutch members and by the continued movement of the latter effect a movement of one member with respect to the other, which movement, it is to be understood, may be to either connect or disconnect such members.

The improvements further consist in an abutment which when moved into active position causes the disconnection of the clutch members by the continued movement of such members, whereby the power exerted by the driving members is utilized to effect the disengagement in contradistinction to power being applied through the abutment for this purpose, and hence the power exerted to move the abutment, whether such power be applied by hand or by automatic means, may be simply sufficient to move it into active position.

The improvements also consist in many other features, novel constructions, and combinations of parts, hereinafter fully set forth.

In the accompanying drawings, which illustrate a practical embodiment of the invention, Figure 1 is a plan view, partly in section, of an air-pump of, say, a fluid-pressure-brake apparatus, its driver, and the means for controlling the connection and disconnection thereof with and from the pump, such means being in active position. Fig. 2 is a vertical section of the same on the line 2 2 of Fig. 1, a portion of the pump and the valve-chest being also in section. Figs. 3 and 4 are, respectively, portions of the mechanism shown in Figs. 1 and 2, the means for controlling the connection and disconnection referred to being shown in inactive position. Fig. 5 is an enlarged horizontal section on the line 5 of Fig. 2.

The improvements are illustrated in connection with an air-pump or compressor A of, for instance, a street-car air-brake apparatus, the latter not being shown, as it forms no part of the present invention. With the pump there is preferably connected a reservoir B, in which the air from the pump is stored for use. A pipe such as $b$ will lead therefrom to a brake-cylinder if the apparatus be of the character referred to. The piston A' of the pump is reciprocated by any usual connection with a crank or other shaft C, which is supported in bearings in brackets $A^2$, secured to the pump-cylinder flange.

The projecting end of the shaft C carries a clutch D, of any usual form so far as its engaging surfaces are concerned, which clutch consists of a clutch member $d$, fixed to turn with the shaft and constituting the driven member, and a coacting clutch member $d'$, loose on the shaft and constituting the driving member thereof. The driving or loose clutch member $d'$ is held against longitudinal movement on the shaft by abutting shoulders on the shaft and clutch member and by a nut $c$ screwed onto the threaded end of the shaft. The driven or fast member $d$ of the clutch is connected to the shaft by a key or keys $c'$, Fig. 5, so as to be capable of longitudinal movement on the shaft to and from engagement with the loose clutch member, the fast member $d$ having on its end face a tooth or teeth 2, for engaging a corresponding recess or recesses 3 in the adjacent end face of the loose clutch member. Of course, instead of the toothed form of engagement a frictional engagement may be provided for.

The driving or loose member of the clutch may be connected to or provided or formed with a toothed periphery forming a gear $d^2$, for receiving motion from any suitable source of power, as, for instance, from an intermeshing pinion $d^3$ on a shaft $d^4$, having at the opposite end a pulley $d^5$, receiving motion from a belt $d^6$. The shaft $d^4$ is shown supported in bearings provided by extensions $A^3$ from the brackets $A^2$. The mode of driving the loose clutch member is, however, unimportant, as any one of a variety of ways may be adopted.

Normally, the driven or fast clutch member is held in engagement with the loose member by a suitably arranged spring 4, against the tension of which the one member is moved from engagement with the other. In the present embodiment of the invention it is preferred to form a central recess or bore 5 in the end of the shaft C, in which lies a longitudinal eyebolt 6, its eye engaging a transverse pin 7, carried by the fast and sliding clutch member, the pin passing through a somewhat elongated slot 8 in the shaft to allow for the longitudinal movement of the fast clutch member and said pin with respect to said shaft. The spring 4 encircles the eyebolt 6 between adjustable nuts on the outer end of the bolt, and a washer 9, loosely encircling the bolt and resting against a shoulder in the bore of the shaft. Of course the spring 4 may be otherwise positioned and yet adapted to normally hold the clutch members in engagement.

The fast and sliding clutch member $d$ is furthermore provided with a cam, incline, or worm 10, formed in this instance by the continuous or unbroken end face of a properly-contoured collar 11, rigid with the clutch member and adapted to coact with a movable abutment 12 to effect the disengagement of the clutch members in either direction of rotation of said cam, as will presently appear.

The movable abutment 12 is represented in the present instance by an antifriction-roll mounted on the end of a rod 13, movable in a guide-bearing 14 into and out of the path of the clutch-member cam 10. The cam shown being a rotating one and rotating when its clutch member rotates, the rod carrying the abutment 12 is movable radially with respect to the axis of rotation of the cam and clutch member, and when moved toward such axis is moved into active position to coact with the cam in effecting the disconnection of the clutch members, and when moved away from such axis is moved into inactive position.

The means for moving or for controlling the position of the abutment 12 with respect to the cam 10 may obviously be varied according to the character of the apparatus with which the improvement is used, and such means may be operated by hand or be automatically operative. In the present instance, where it is desirable and necessary that the pump should, entirely irrespective and independent of the attention of the motorman, maintain a required pressure in the brake apparatus or its reservoir, the means preferably employed for controlling the position of the abutment is entirely automatic, so that the pump shall always be started when the required pressure is reduced and stopped when such pressure is attained. To this end there is provided a controlling device E, consisting of a cylinder 22 having a piston 23 arranged to be moved in one direction by a suitable spring 21 and in the reverse direction by a predetermined fluid-pressure capable of overcoming the tension of said spring. Thus at one side of the piston the cylinder 22 is in constant communication by a pipe 24 with the air-reservoir B; on its opposite side the piston-stem projects through the cylinder and abuts against the slotted head 18 of a rod 19 that is supported at one end thereby and at its opposite end by a guide-bearing 20. The spring 21 encircles this rod 19 and is interposed between its head 18 and said bearing 20. The connection between the piston and spring and the movable abutment 12 is had through a lever 15, pivoted and fulcrumed at its lower end to a bracket 16, projecting from the cylinder 22, pivotally connected at its upper end to the end of the abutment-carrying rod 13 and intermediately passing through the slot of the head 18, which carries a pin 17, engaging a slot in the lever. When the fluid-pressure in the apparatus is at its required height, such pressure will be sufficient to overcome the tension of the spring 21 and will move the piston outward to the limit of its stroke in one direction and thus have rocked the lever 15 and moved the abutment 12 into its active position, (shown in Figs. 1 and 2,) having caused, as will presently appear, the disconnection of the clutch members, and remaining in such position will maintain such disconnection, during which the shaft C will remain at rest and the pump be inoperative, while the driving clutch member will continue its rotations. As soon as the fluid-pressure in the apparatus is insufficient to overbalance the tension of the spring 21, such spring will move the piston 23 to the opposite end of its cylinder and have thereby rocked the lever 15 in the reverse direction and have moved the abutment into its inactive position, allowing the clutch members to engage suddenly under the tension of the spring 4, as in Figs. 3 and 4, whereupon the shaft C will be rotated and the pump rendered active to restore the predetermined fluid-pressure.

Assuming that the apparatus is in operation with the clutch members in engagement and that the required pressure in the apparatus has been reached, a movement of the abutment 12 thereupon takes place, by the means described, so that said abutment is entered into the path of the cam 10; whereupon, as the clutch members continue their rotations, the endless or unbroken cam-face riding against the abutment gradually forces itself, together with the clutch member connected thereto, longitudinally along the shaft C, away from the other clutch member, this longitudinal movement continuing, and the cam being so shaped until both members are wholly disconnected, at which time the fast clutch member and the parts connected to its shaft will come to rest, the loose clutch member continuing to rotate. From which it will be seen that after the abutment has been set in its active position the unclutching or disengagement of the clutch members is effected by their continued rotation, or, in other words, the power transmitted through the driving clutch member is used to effect the disengagement. It will also be observed that while the abutment 12 will be moved into active position for the action of the cam thereon, it still requires a more or less of a rotation of the clutch members and shaft before the actual disengagement of the clutch members occurs, and hence opportunity is given for a slight excess of pressure to accumulate in the apparatus above the amount that may be simply required to move the abutment into active position and compress the spring 21, which insures a positive and quickly-responsive movement on part of the abutment.

The active position of the abutment 12 holding the clutch members disengaged continues until the pressure in the apparatus has been so far reduced that the spring 21 may return the abutment to its inactive position, allowing the clutch members to reëngage and the pump caused to operate. In this return of the abutment the reëngagement of the clutch members under the tension of the spring 4 is necessarily delayed until the abutment is clear of the cam 10 or has withdrawn a distance equal to the width of the face of the cam, which gives an opportunity for a further reduction of pressure to occur in the apparatus sufficient to permit the abutment to retain its inactive position for more or less of a rotation of the shaft to permit a sufficient operation of the pump to fully restore the required pressure, so that when the abutment is subsequently moved into active position such movement will be a positive one.

In order to offset the lateral thrust of the cam 10 on the abutment during the unclutching operation, said abutment is stayed by an abutting flange 30, formed on or rotatable with the loose clutch member, and which is directly opposed to the thrust of the cam on the abutment. As this staying-flange constantly rotates, it offers little resistance to the withdrawal of the abutment from active position and in fact tends to accelerate such movement, inasmuch as the antifriction-roll forming the abutment is subject to the law of centrifugal force and tends to move to the larger diameter of the flange.

When the improved controlling device is used in connection with an air-pump, as herein described, the cam 10 should be so located on the shaft C with reference to its crank as that the highest point or farthest projection of the cam should be in contact with the abutment when the crank is on either of its dead-centers. That is to say, the cam should be in position to have thrown the sliding clutch member out of engagement at the moment the crank passes its center, for the reason that when the crank is at center there is no work being performed, and hence immediately the center is passed with the pump-piston at its innermost position the expansion of a small quantity of air in the pump-cylinder will be sufficient to insure the non-return of the shaft and absolutely hold the parts at rest with the highest part of the cam bearing against the abutment 12, to preserve the disconnection of the clutch members. Furthermore, when the abutment is subsequently moved to its inactive position and the clutch members are reengaged, the pump starts easily, because it is just beginning to perform work and has a cushion of air in the cylinder either "positive" or "negative" to take up the shock of the reengagement. The wear of the engaging shoulders of the clutch is thus reduced to the minimum.

What is claimed is—

1. In a governor, the combination of the members of a clutch, an endless cam-surface movable with one of the members, and an abutment coacting with the cam to cause the movement of one member with respect to the other, in either direction of rotation of said members, as set forth.

2. In a governor, the combination of the members of a clutch, an endless cam-surface movable with one of the members, and an automatically-operative abutment coacting with the cam to cause the movement of one member with respect to the other, in either direction of rotation of said members, as set forth.

3. In a governor, the combination of the members of a clutch, an endless cam-surface movable with one of the members, and a pressure-controlled abutment coacting with the cam to cause the movement of one member with respect to the other, in either direction of rotation of said members, as set forth.

4. The combination with the driver and driven members of a clutch and an endless cam-surface connected and movable with one of said members, of an abutment fixed relatively to the movement of the clutch members and cam, and coacting with said cam, and means for moving the clutch and cam to cause the movement of one clutch member relative to the other and to the abutment, in either direction of rotation of said members, as set forth.

5. The combination with the driver and driven members of a clutch and an endless cam-surface carried by the driven member, of an abutment fixed relatively to the movement of the clutch members and cam, and means for rotating the clutch and cam to cause the lateral movement of the driven member and cam relative to the other member and to the abutment, in either direction of rotation of said members, as set forth.

6. The combination of the pump, its crank-shaft and a driver therefor, clutch members interposed between the driver and the crank of said shaft, a cam movable with one of said members, and a coacting abutment mounted to engage the high or disengaging part of the cam when the pump-crank is at dead-center to disengage the clutch members at such point only, as set forth.

7. The combination of the pump its crank-shaft and a driver therefor, clutch members mounted on the shaft, a cam carried by one member with its high or disconnecting point set coincident with the dead-center of the crank, and a coacting abutment engaging said cam to disengage the clutch members, as set forth.

8. The combination with the members of a clutch having an endless cam-surface, of an abutment for coaction with the cam, automatically-controlled means for moving the abutment into the path of the cam, and means for moving the clutch and cam to cause the disengagement of the clutch members, in either direction of rotation thereof, as set forth.

9. The combination with the members of a rotatable clutch having an endless cam-surface, of an abutment, means for moving the abutment into the path of the cam, and means for rotating the clutch and cam to cause the disengagement of the clutch members, in either direction of rotation thereof, as set forth.

10. The combination with the driven and driver members of a clutch and an endless cam-surface on the driven member, of an abutment, pressure-controlled means for moving the abutment into the path of the cam, means for moving the clutch and cam to cause the disengagement of the clutch members, in either direction of rotation thereof, and a spring for removing the abutment out of the path of the cam to allow the engagement of the clutch members, as set forth.

11. The combination with the members of a clutch, a spring normally holding the members engaged, and an endless cam-surface carried by one member, of an abutment, pressure-controlled means for moving the abutment into the path of the cam, means for moving the clutch and cam to cause the disengagement of the clutch members against the tension of said spring, in either direction of rotation of said members, and a spring for removing the abutment out of the path of the cam to allow said first-named spring to cause the reëngagement of the clutch members, as set forth.

12. The combination of the pump and its crank-shaft, driven and driver members of a clutch mounted on said shaft, an endless cam-surface carried with one clutch member, an abutment coacting with said cam and clutch member, a pressure-controlled device connected to the pump for moving the abutment into active position and means for driving the clutch members to operate the pump and to cause the disengagement of the clutch members in either direction of rotation thereof when the abutment has been moved into active position, as set forth.

13. The combination of the pump, its crank-shaft and a driver therefor, clutch members interposed between the driver and the shaft, an endless cam-surface carried by one member, an abutment for coaction with said cam and clutch member, a pressure-controlled device connected with the pump and to the abutment to move the latter into active position to cause the disengagement of the clutch members in either direction of rotation thereof and during the continued operation of the pump, as set forth.

14. The combination of the driven and driver members of a clutch, a spring normally holding the members engaged, an endless cam-surface carried by one member, a reciprocating abutment to engage the cam, a cylinder having a piston connected to said abutment, a reservoir for fluid-pressure connected to the cylinder on one side of the piston for moving said piston in one direction and placing the abutment in the path of said cam, and a spring for moving the piston in the opposite direction and withdrawing the abutment from said path, as set forth.

15. The combination of the clutch members, an endless cam-surface on one member, an opposed flange on the other member, an abutment, means for moving the abutment between the cam and flange, and means for moving the clutch members to cause their disengagement, in either direction of rotation of said members, as set forth.

In witness whereof I have hereunto set my hand in the presence of two witnesses.

HENRY L. HOWE.

Witnesses:
 E. M. MORSE,
 C. B. LAPHAM.